US010748721B2

(12) United States Patent
Kitamura et al.

(10) Patent No.: US 10,748,721 B2
(45) Date of Patent: Aug. 18, 2020

(54) PUSH BUTTON DEVICE, KEYBOARD DEVICE, AND ELECTRONIC APPARATUS

(71) Applicant: LENOVO (SINGAPORE) PTE. LTD., Singapore (SG)

(72) Inventors: Masahiro Kitamura, Yokohama (JP); Mitsuo Horiuchi, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 207 days.

(21) Appl. No.: 16/027,319

(22) Filed: Jul. 4, 2018

(65) Prior Publication Data
US 2019/0311867 A1 Oct. 10, 2019

(30) Foreign Application Priority Data
Apr. 6, 2018 (JP) .................................. 2018073632

(51) Int. Cl.
*H01H 13/14* (2006.01)
*H01H 13/7065* (2006.01)
*G06F 1/16* (2006.01)

(52) U.S. Cl.
CPC ....... *H01H 13/7065* (2013.01); *G06F 1/1662* (2013.01); *G06F 1/1616* (2013.01); *H01H 2221/058* (2013.01); *H01H 2233/046* (2013.01)

(58) Field of Classification Search
CPC ......... H01H 13/7065; H01H 2221/058; H01H 2233/046; G06F 1/1616; G06F 1/1662
See application file for complete search history.

(56) References Cited

U.S. PATENT DOCUMENTS

| 7,238,908 B1* | 7/2007 | Chen ..................... H01H 3/125 200/344 |
| 10,475,598 B2* | 11/2019 | Chang ................... H01H 3/125 |
| 2014/0138223 A1* | 5/2014 | Jhuang .................. H01H 3/125 200/344 |

(Continued)

FOREIGN PATENT DOCUMENTS

| JP | 10040773 A | 2/1998 |
| JP | 2001297651 A | 10/2001 |

(Continued)

*Primary Examiner* — Matthew G Marini
*Assistant Examiner* — Marissa Ferguson-Samreth
(74) *Attorney, Agent, or Firm* — Shimokaji IP

(57) ABSTRACT

A push button device can stabilize an operation of a guide mechanism and can enhance product quality. A keyboard device includes the push button device and electronic apparatus includes the keyboard device. A key switch that is a push button device includes a key cap as a push button, a base plate, and a guide mechanism. The guide mechanism includes an outer frame member and an inner member. An outer frame member has a pair of inner surfaces opposed to each other with interposition of an opening in which the inner member is disposed, and each of the pair of inner surfaces is provided with a bearing hole to serve as a first engagement part. The inner member has a pair of outer surfaces opposed to the pair of inner surfaces of the outer frame member, and each of the pair of outer surfaces is provided with a rotation shaft to be a second engagement part. An outer peripheral surface of the rotation shaft has a tapered portion whose outer diameter gradually decreases in an insertion direction of the bearing hole.

6 Claims, 7 Drawing Sheets

(56) References Cited

U.S. PATENT DOCUMENTS

| | | | |
|---|---|---|---|
| 2014/0138224 A1 | 5/2014 | Primax | |
| 2015/0090568 A1* | 4/2015 | Chen | H01H 3/125 200/344 |
| 2016/0365205 A1* | 12/2016 | Chang | H01H 13/7065 |
| 2017/0191612 A1* | 7/2017 | Yen | H01H 3/125 |
| 2018/0053610 A1* | 2/2018 | Liu | F21V 33/0052 |

FOREIGN PATENT DOCUMENTS

| | | |
|---|---|---|
| JP | 2003031067 A | 1/2003 |
| JP | 2006309963 A | 11/2006 |
| JP | 2015141868 A | 3/2015 |

\* cited by examiner

PUSH BUTTON DEVICE, KEYBOARD DEVICE, AND ELECTRONIC APPARATUS

FIELD OF THE INVENTION

The present invention relates to a push button device, a keyboard device including the push button device, and electronic apparatus including the keyboard device.

BACKGROUND OF THE INVENTION

A keyboard device for use in electronic apparatus such as a personal computer has a configuration in which a plurality of push button devices (key switches) are arranged. The keyboard device is generally configured to include key caps vertically movable on a base plate. Some keyboard devices of this type are configured to include a guide mechanism having a pantograph structure provided between the base plate and the key caps to guide vertical movement of the key caps (see Japanese Patent Application Laid-Open No. 2015-141868).

SUMMARY OF THE INVENTION

The guide mechanism having the pantograph structure as described above includes an outer frame member and an inner frame member disposed inside the outer frame member and diagonally braced to the outer frame member. Thus, unless a rotation shaft and a bearing hole for connecting the outer frame member and the inner frame member to each other have a certain degree of a margin for the connection, the guide mechanism does not smoothly move vertically. On the other hand, if the margin is excessively large, an operation of the key caps is unstable so that product quality degrades and noise and other problems can occur. In particular, in an isolation-type keyboard device in which the key caps are partitioned by a frame as in Japanese Patent Application Laid-Open No. 2015-141868 described above, a large margin for the key caps would cause the key caps to interfere with the frame, resulting in a possibility of a failure in normal operation. Problems caused by such a backlash of the guide mechanism can occur similarly in push button devices except the keyboard device.

Some aspects of the present invention have been made in view of the foregoing problems in conventional techniques, and have an object of providing a push button device that can stabilize an operation of a guide mechanism and enhance product quality, a keyboard device including the push button device, and electronic apparatus including the keyboard device.

Means for Solving the Problems

A push button device according to a first aspect of the present invention includes: a base part; a guide mechanism disposed on an upper surface of the base part; and a push button that is guided by the guide mechanism to be vertically movable, wherein the guide mechanism includes an outer frame member having a first end rotatably supported on the base part and a second end rotatably supported on the push button, and an inner member disposed inside the outer frame member and diagonally braced to the outer frame member, the inner member having a first end rotatably supported on the push button and a second end rotatably supported on the base part, the outer frame member has a pair of inner surfaces opposed to each other with interposition of an opening in which the inner member is disposed, each of the pair of inner surfaces being provided with a first engagement part that is one of a bearing hole and a rotation shaft, the inner member has a pair of outer surfaces opposed to the pair of inner surfaces of the outer frame member, each of the pair of outer surfaces being provided with a second engagement part that is the other one of the bearing hole and the rotation shaft, the second engagement part being rotatably engaged with the first engagement part, and the rotation shaft has an outer peripheral surface including a tapered portion whose outer diameter gradually decreases in an insertion direction of the bearing hole.

In this configuration, the outer frame member and the inner member constituting the guide mechanism are rotatably connected to each other with the tapered portion of the rotation shaft being inserted in the bearing hole. Thus, a backlash between the rotation shaft and the bearing hole is absorbed by the tapered portion in the longitudinal, lateral, and vertical directions to be minimized. Consequently, a vertical operation of the guide mechanism can be stabilized and noise can be reduced so that product quality of the push button device can be thereby enhanced.

The rotation shaft may have a base portion including the tapered portion and have a distal end portion including a cylindrical shaft portion, and in the rotation shaft, the shaft portion may be inserted in the bearing hole, and a part of the tapered portion may be inserted in the bearing hole. In this case, even if the tapered portion is removed from the bearing hole due to warpage or the like of the outer frame member and the inner member, the shaft portion at the distal end functions as a stopper so that smooth vertical movement can be maintained.

The outer peripheral surface of the tapered portion of the rotation shaft may be in contact with an opening edge of the beading hole. In this case, a backlash between the outer frame member and the inner member can be further reduced.

The inner member may be a frame member having an opening inside the inner member. In this case, the inner member as well as the outer frame member is elastically deformable, and thus, the outer frame member and the inner member can be connected to each other with the tapered portion appropriately interfering with an opening edge of the bearing hole. As a result, the guide mechanism can further reduce a backlash between the outer frame member and the inner member and can further ensure absorption of manufacturing tolerance and manufacturing errors.

A keyboard device according to a second aspect of the present invention includes the plurality of push button devices having the configuration described above.

The keyboard device may include a frame partitioning adjacent ones of the push buttons. In this case, even in the keyboard device including the frame, guide mechanism can reduce a backlash of the push button devices (key switches) so that interference of the push buttons with the frame can be reduced. Consequently, errors in operation of the keyboard device can be reduced. In addition, in the push button device, since a backlash is reduced, a gap between each push button and the frame can be minimized so that product quality can be further enhanced.

An electronic apparatus according to a third aspect of the present includes: a chassis equipped with the keyboard device according to claim 5 or 6; and a display chassis including a display that displays in accordance with an input operation to at least one of the push button devices of the keyboard device, the display chassis being rotatably connected to the chassis.

Effects of the Invention

In the aspects of the present invention, an operation of the guide mechanism can be stabilized so that product quality can be enhanced.

DETAILED DESCRIPTION OF THE INVENTION

A push button device according to a preferred embodiment of the present invention in relation to a keyboard device and electronic apparatus including the push button will be described in detail hereinafter with reference to the accompanying drawings.

Figure 1:
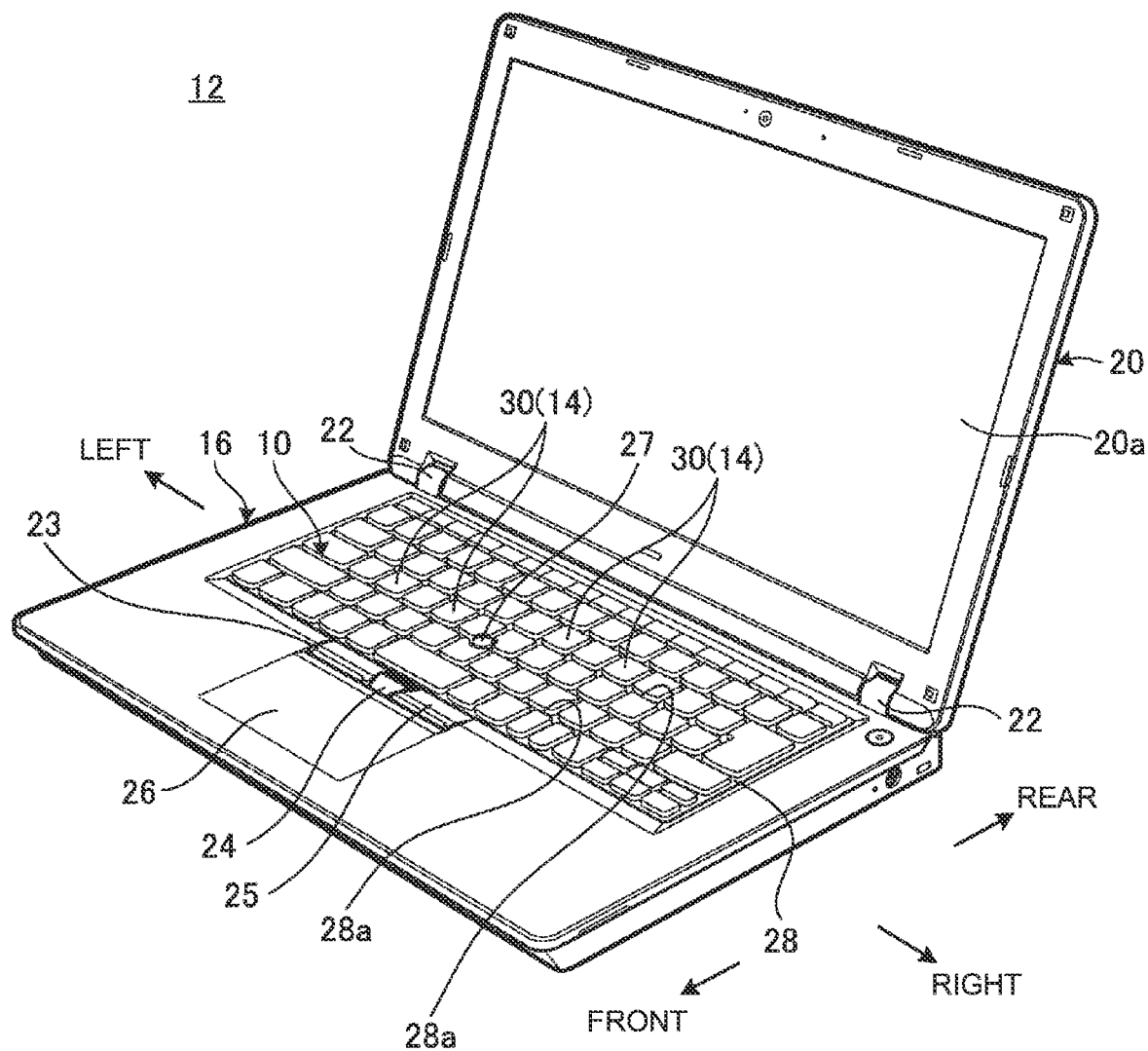
FIG. 1 is a perspective view illustrating electronic apparatus including a keyboard device according to an embodiment of the present invention.

FIG. 1 is a perspective view of electronic apparatus 12 including a keyboard device 10 according to an embodiment of the present invention. The following description is based on a state of use where the keyboard device 10 and key switches (push button devices) 14 constituting the keyboard device 10 are mounted on the electronic apparatus 12 illustrated in FIG. 1, and the side toward a user, the side away from the user, the thickness direction, and the width direction will be hereinafter referred to as the front, the rear, the vertical direction, and the lateral direction, respectively.

As illustrated in FIG. 1, the electronic apparatus 12 is a laptop PC including a main body chassis 16 including the keyboard device 10, and a display chassis 20 including a display device 20a such as a liquid crystal display. The display chassis 20 is connected to the main body chassis 16 with a pair of left and right hinges 22 and 22 so that the display chassis 20 can be opened and closed.

The main body chassis 16 houses, therein, various electronic components such as an unillustrated board, an arithmetic processing unit, a hard disk device, and a memory. On the upper surface of the main body chassis 16, the keyboard device 10, click buttons 23, 24, and 25, and a click pad 26 are arranged in this order from the rear toward the front. A pointing stick 27 is disposed substantially at the center of the keyboard device 10.

The keyboard device 10 includes the plurality of key switches 14 and is of an isolation type in which peripheries of the key switches 14 are partitioned by a frame 28. The frame 28 has a plurality of apertures 28a in which key caps (push buttons) 30 of the key switches 14 are inserted to be vertically movable. In this embodiment, the key caps 30 and the apertures 28a are substantially rectangular in plan view. The click pad 26 and the pointing stick 27 are used for operating a cursor (mouse pointer) displayed on the display device 20a, and is an input unit that can be operated instead of a mouse. The click pad 26 also has a button structure that enables a depression operation, and is capable of outputting a signal in accordance with a touch region in the depression operation, for example. The click buttons 23 through 25 function in cooperation with a cursor operation with the click pad 26 or the pointing stick 27. For example, the click buttons 23 through 25 correspond to a left button, a center button, and a right button, respectively, of a general mouse.

Figure 2:
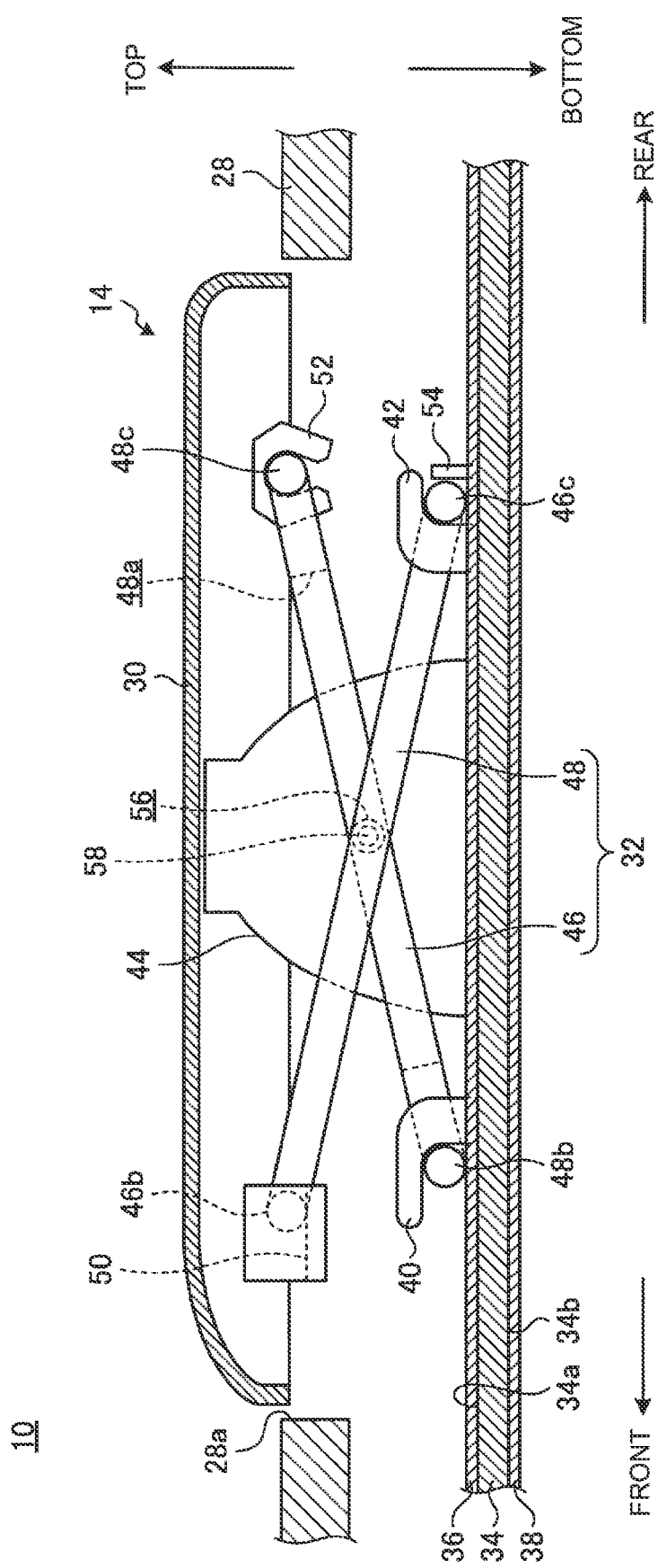
FIG. 2 is a partial cross-sectional side view schematically illustrating a configuration of the keyboard device.

Next, a specific configuration of the keyboard device 10 according to this embodiment will be described. FIG. 2 is a partial cross-sectional side view schematically illustrating a configuration of the keyboard device 10 and is a view illustrating a predetermined one of the key switches 14 and its periphery in an enlarged manner.

As illustrated in FIG. 2, the keyboard device 10 includes: the key switch 14 in which the key cap 30 is vertically movably supported by a guide mechanism 32; a base plate (base part) 34; a membrane sheet 36; and a backlight sheet 38.

The base plate 34 is a fixing plate for the key switches 14. The base plate 34 is formed by performing a cutting and raising machining or a punching machining on a metal plate-like member such as a stainless plate or an aluminum plate having a thickness of, for example, 0.3 mm. The base plate 34 has an upper surface 34a on which pairs of left and right locking pieces 40 and 42 for attaching the guide mechanism 32 are disposed at the front and rear, respectively. Each of the front locking pieces 40 has a hook shape facing forward, and each of the rear locking pieces 42 has a hook shape facing rearward. The frame 28 is fixed to the upper surface 34a of the base plate 34 with an engagement structure or a screw structure using through holes formed in various portions of the membrane sheet 36.

The membrane sheet 36 is laminated on the upper surface 34a of the base plate 34. The membrane sheet 36 is, for example, a switch sheet having a three-layer structure whose contact is made when depressed. Specifically, in the switch sheet, when a portion where a fixed contact and a movable contact overlap each other is depressed, the fixed contact and the movable contact are brought into close contact with each other so that the contact is thereby made. When the contact is made, the membrane sheet 36 outputs a signal in accordance with the corresponding key switch 14, and as a result, predetermined characters, a predetermined image or picture, and the like is displayed on the display device 20a. The membrane sheet 36 may be laminated on a lower surface 34b of the base plate 34.

A rubber dome 44 is disposed between the membrane sheet 36 and the key cap 30. The rubber dome 44 is a dome-shaped member made of a flexible elastic material such as silicone rubber. When the key cap 30 is depressed, the rubber dome 44 presses the membrane sheet 36, and when the depression operation of the key cap 30 is canceled, the rubber dome 44 returns the key cap 30 to an original position.

The backlight sheet 38 is laminated on the lower surface 34b of the base plate 34. The backlight sheet 38 includes, for example, a transparent or translucent light guide plate made of a resin such as PET, polycarbonate, or acrylate. A light source such as an LED device is disposed at a lateral center or a lateral end of the backlight sheet 38. The backlight sheet 38 laterally guides light emitted from the light source, and reflects the light on a light reflecting surface thereof so that the key cap 30 is irradiated from the back surface. The backlight sheet 38 may be replaced by a waterproof sheet of rubber or a resin.

Figure 3:
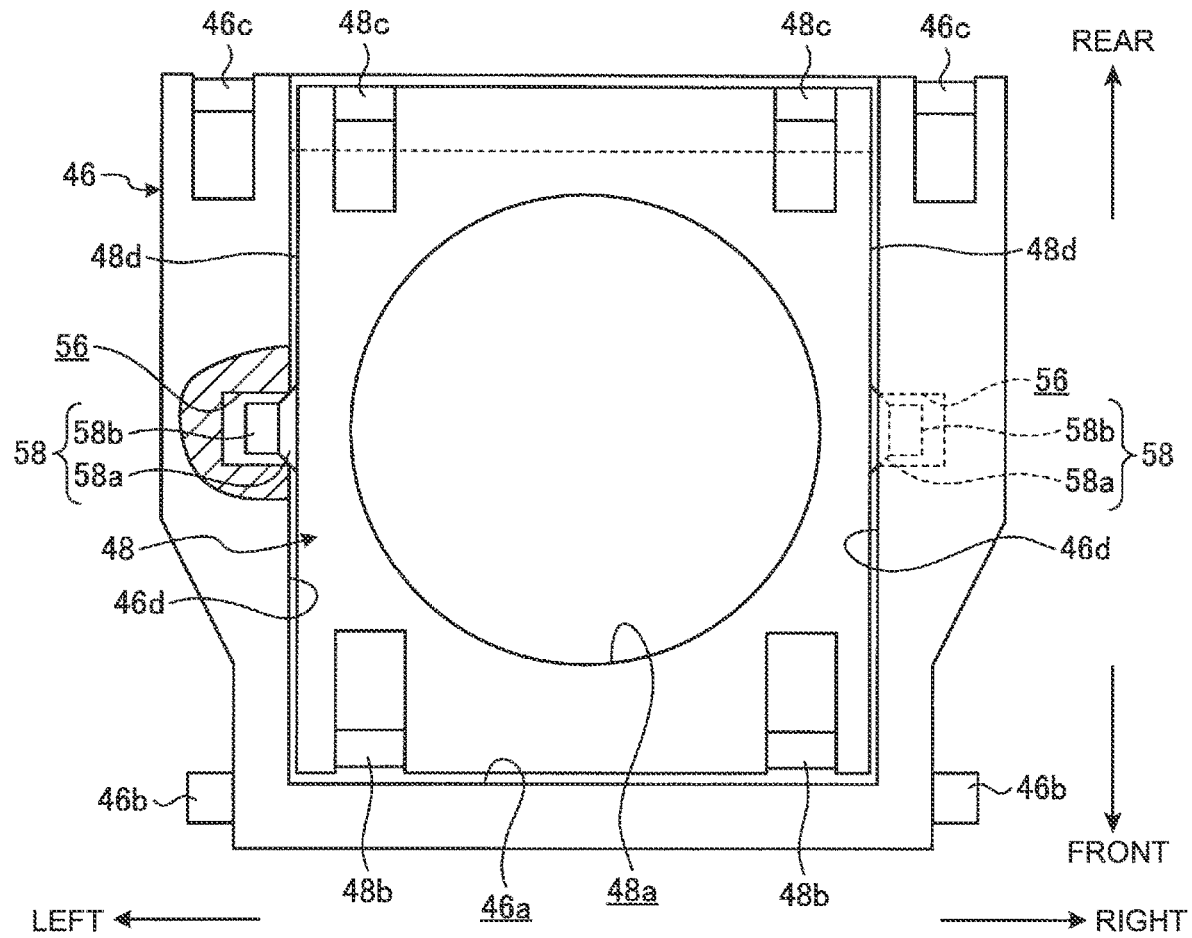
FIG. 3 is a plan view schematically illustrating a configuration of a guide mechanism.

FIG. 3 is a plan view schematically illustrating a configuration of the guide mechanism 32.

As illustrated in FIGS. 2 and 3, the guide mechanism 32 has a pantograph structure (pinch structure) supporting the key cap 30 so that the key cap 30 can move vertically, and is foldably provided between the base plate 34 and the key cap 30. The guide mechanism 32 is formed by diagonally bracing an outer frame member 46 and an inner member (inner frame member) 48.

The outer frame member 46 is a frame member having an opening 46a therein in which the inner member 48 is disposed. The outer shape and the inner shape of the outer frame member 46 are substantially rectangular in plan view. The outer frame member 46 includes a pair of left and right support shafts 46b and 46b disposed at the front end and a pair of left and right support shafts 46c and 46c disposed at the rear end. On the lower surface of the key cap 30, a pair of left and right locking parts 50 and 50 is disposed at the front end, and a pair of left and right bearing parts 52 and 52 is disposed at the rear end. In the outer frame member 46, the support shafts 46b at the front end (second end) are rotatably supported by the locking parts 50 of the key cap 30 to be movable longitudinally (front-rear directions), and the support shafts 46c and 46c at the rear end (first end) are rotatably supported by the locking pieces 42 of the base plate 34 to be immovable longitudinally. As illustrated in FIG. 2, the base plate 34 includes stopper pieces 54 standing behind the locking pieces 42, and the support shafts 46c are held between the locking pieces 42 and the stopper pieces 54. The outer frame member 46 may be configured such that the support shafts 46b are rotatably supported by the locking parts 50 to be immovable longitudinally and the support shafts 46c are rotatably supported by the locking pieces 42 to be movable longitudinally.

The inner member 48 is a frame member having an opening 48a in which the rubber dome 44 is inserted. The outer shape of the inner member 48 is substantially rectangular in plan view, and the inner shape of the inner member 48 is substantially circular in plan view. The inner member 48 includes a pair of left and right support shafts 48b and 48b disposed at the front end, and a pair of left and right support shafts 48c and 48c disposed at the rear end. In the inner member 48, the support shafts 48b at the front end (second end) are rotatably supported by the locking pieces 40 of the base plate 34 to be movable longitudinally, and the support shafts 48c and 48c at the rear end (first end) are rotatably supported by the bearing parts 52 of the key cap 30 to be immovable longitudinally. The inner member 48 may be configured such that the support shafts 48b are rotatably supported by the locking pieces 40 to be immovable longitudinally, and the support shafts 48c are rotatably supported by the bearing parts 52 to be movable longitudinally.

The outer frame member 46 and the inner member 48 are rotatably connected to each other substantially at the longitudinal center. The outer frame member 46 has a bearing hole 56 in each of a pair of left and right inner surfaces 46d and 46d opposed to each other with interposition of the opening 46a. Each bearing hole 56 is a hole that is circular in cross section and faces the opening 46a. The bearing holes 56 face each other with interposition of the opening 46a and the inner member 48 disposed in the opening 46a. In this embodiment, although the bearing holes 56 are not through holes (see FIG. 3), the bearing holes 56 may be through holes penetrating from the opening 46a to the outside of the frame of the outer frame member 46. In the inner member 48, a rotation shaft 58 is disposed to each of a pair of outer surfaces 48d and 48d facing the pair of inner surfaces 46d and 46d of the outer frame member 46. The rotation shafts 58 project from the outer surfaces 48d outward (to the outside of the frame), and are inserted in the bearing holes 56 of the outer frame member 46.

Figure 4:
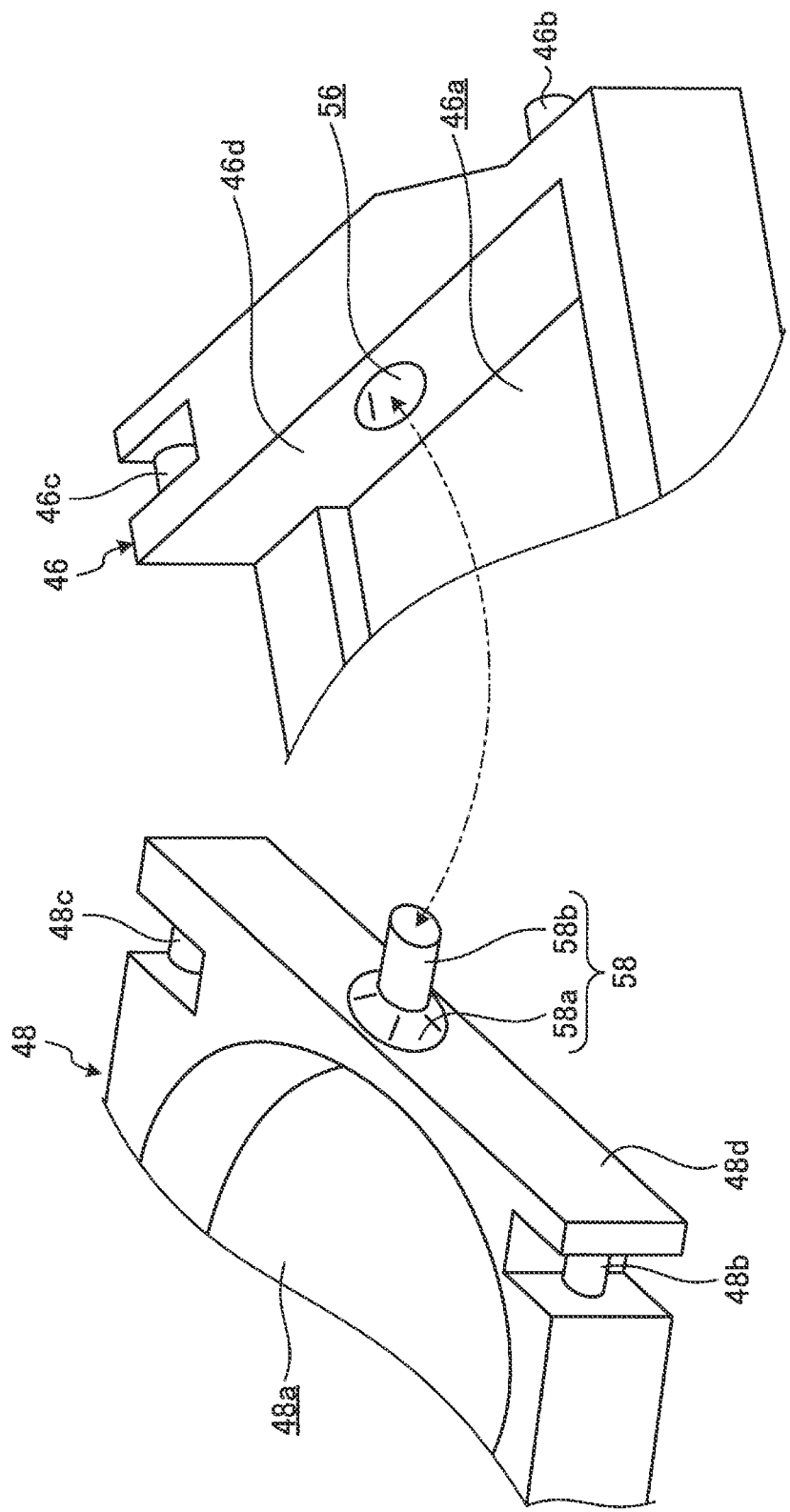
FIG. 4 is a disassembled perspective view of a main portion schematically illustrating a connection structure between a rotation shaft and a bearing hole in an enlarged manner.
Figure 5:
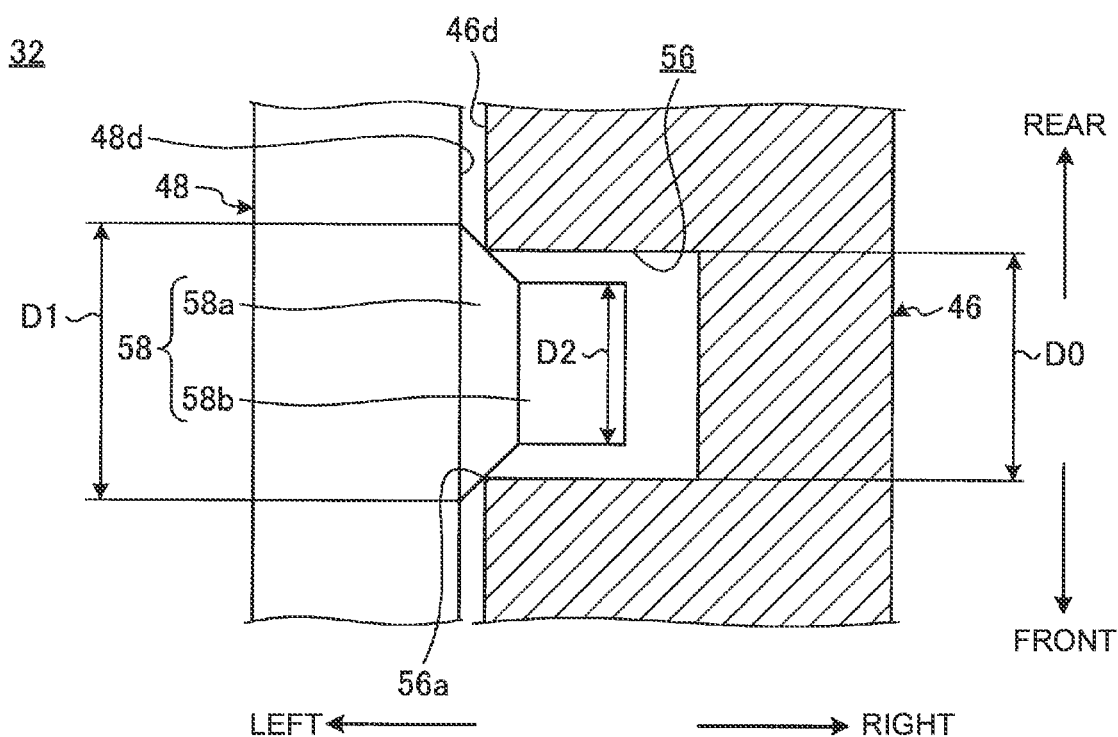
FIG. 5 is a sectional plan view of a main portion schematically illustrating a connection state between the rotation shaft and the bearing hole in an enlarged manner.

FIG. 4 is a disassembled perspective view of a main portion schematically illustrating a connection structure between the rotation shaft 58 and the bearing holes 56 in an enlarged manner. FIG. 5 is a sectional plan view of a main portion schematically illustrating a connection state between the rotation shaft 58 and the bearing hole 56 in an enlarged manner. In FIGS. 4 and 5, the rotation shaft 58 and the bearing hole 56 at the right in FIG. 3 are illustrated as representative examples. The rotation shaft 58 and the bearing hole 56 at the left in FIG. 3 are symmetric to those at the right, and thus, detailed description will not be repeated.

As illustrated in FIGS. 4 and 5, the rotation shaft 58 includes a tapered portion 58a and a shaft portion 58b. The tapered portion 58a is a tapered annular tilt surface that is disposed on the outer surface 48d and a base portion of the rotation shaft 58 and has its outer diameter decrease in the insertion direction of the bearing hole 56. The shaft portion 58b is disposed at the distal end of the rotation shaft 58 and has a cylindrical shape.

As illustrated in FIG. 5, the tapered portion 58a has a proximal outer diameter D1 larger than an inner diameter D0 of the bearing hole 56 and has a distal outer diameter D2 smaller than the inner diameter D0 of the bearing hole 56. The outer diameter of the shaft portion 58b is set to be equal to the outer diameter D2 at the distal end of the tapered portion 58a. Accordingly, the whole length of the shaft portion 58b at the distal end of the rotation shaft 58 is inserted in the bearing hole 56 so that a part of the tapered portion 58a is inserted in the bearing hole 56.

Thus, in the guide mechanism 32 of this embodiment, the inner member 48 and the outer frame member 46 are rotatably connected to each other with the outer peripheral surface of the tapered portion 58a being slidably in contact with an opening edge 56a of the bearing hole 56 (see FIGS. 3 and 5). That is, in the guide mechanism 32, since the rotation shaft 58 has the tapered portion 58a, the inner member 48 and the outer frame member 46 are rotatably connected to each other with parts of the tapered portions 58a of the left and right rotation shafts 58 being inserted in the left and right bearing holes 56. Accordingly, backlashes between the rotation shafts 58 and the bearing holes 56 can be absorbed by the tapered portions 58a in the longitudinal, lateral, and vertical directions to be minimized. Consequently, longitudinal, lateral, and vertical backlashes between the inner member 48 and the outer frame member 46 can be minimized so that a vertical operation of the guide mechanism 32 can be stabilized and noise can be reduced.

As a result, product quality of the key switches 14 (the keyboard device 10) can be enhanced.

At this time, the distal ends (and the shaft portions 58*b*) of the tapered portions 58*a* of the rotation shafts 58 are inserted in the bearing holes 56 with a certain degree of margin (dimensional tolerance), and interference between the outer peripheral surfaces of the tapered portions 58*a* and the opening edges 56*a* is linear contact. Thus, rotation operation between the inner member 48 and the outer frame member 46 is smooth, and a vertical operation of the guide mechanism 32 is not impaired. In this embodiment, the rotation shafts 58 and the bearing holes 56 are made of a material having self-lubricity, such as a polyacetal (POM) or polytetrafluoroethylene (PTFE). Accordingly, an operation of the guide mechanism 32 is more stable, and abrasion of the rotation shafts 58 and the bearing holes 56 is small.

The keyboard device 10 includes the frame 28 partitioning the key caps 30. Thus, backlashes of the key caps 30 can be reduced by the guide mechanism 32 so that interference of the key caps 30 with the frame 28 can be prevented, and accordingly, failures in operation of the keyboard device 10 can be further reduced. In addition, since backlashes of the key caps 30 are suppressed, gaps between the key caps 30 and the apertures 28*a* of the frame 28 can be minimized. As a result, product quality of the keyboard device 10 can be further enhanced.

This embodiment provides the frame member in which openings 48*a* are provided not only in the outer frame member 46 but also in the inner member 48 as the inner member is disposed inside the outer frame member 46. Thus, in a state where the tapered portion 58*a* interferes with the opening edge 56*a* of the bearing hole 56, minute elastic deformation in which the outer frame member 46 protrudes outward due to pressing forces of the tapered portion 58*a* and the opening edge 56*a* occurs, and at the same time, minute elastic deformation in which the inner member 48 is recessed inward also occurs. As a result, the guide mechanism 32 can further reduce backlashes between the inner member 48 and the outer frame member 46 and can further ensure absorption of manufacturing tolerance and manufacturing errors. Thus, a vertical operation can be further stabilized. The inner member 48 may be constituted by a flat-plate member having no openings 46*a*.

Figure 6:
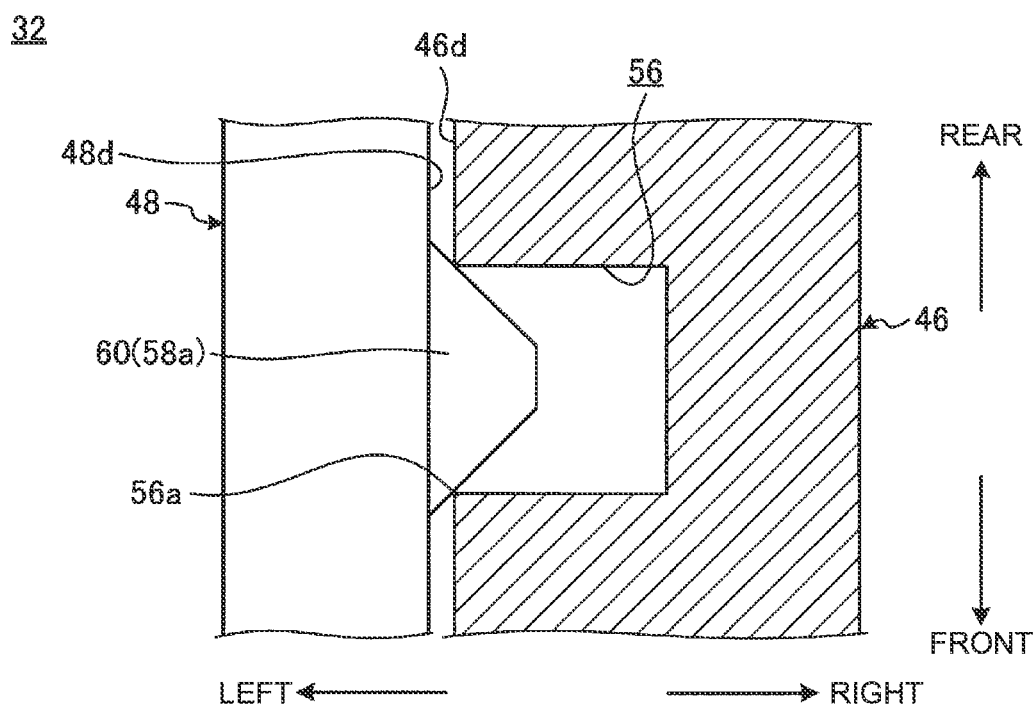
FIG. 6 is a sectional plan view of a main portion schematically illustrating a connection state between a rotation shaft and a bearing hole according to a variation in an enlarged manner.

The rotation shaft 58 of each key switch 14 includes the shaft portion 58*b* at the distal end of the tapered portion 58*a*. Thus, even if the tapered portion 58*a* is removed from the bearing hole 56 when the outer frame member 46 protrudes in a direction in which the inner surfaces 46*d* and 46*d* move away from each other or when the inner member 48 warps in a direction in which the outer surfaces 48*d* and 48*d* move close to each other, the shaft portion 58*b* serves as a stopper against removal from the bearing hole 56. Of course, with some applications, shapes, and materials, for example, of the guide mechanism 32, removal of the tapered portion 58*a* from the bearing hole 56 does not need to be taken into consideration in some cases. In view of this, in such cases, the shaft portion 58*b* may be omitted as illustrated in FIG. 6 so that a rotation shaft 60 constituted only by the tapered portion 58*a* may be used. The shape of the rotation shaft 60 may be a truncated cone as illustrated in FIG. 6, or may be cone with a pointed vertex.

The present invention is not limited to the embodiment described above, and can be, of course, freely changed without departing from the gist of the invention.

Figure 7:
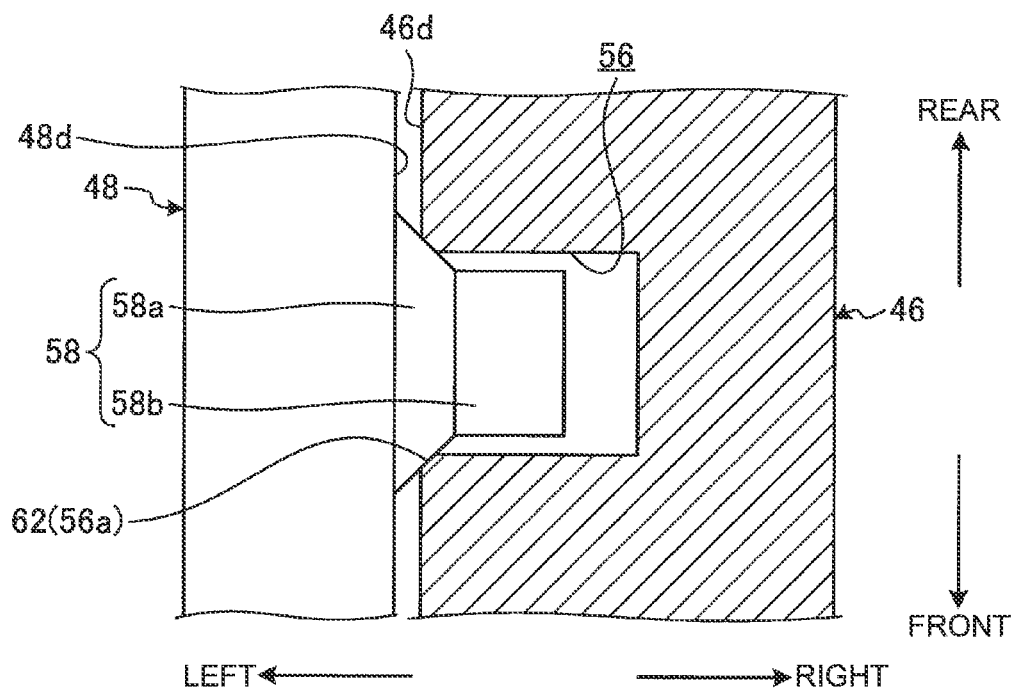
FIG. 7 is a sectional plan view of a main portion schematically illustrating a connection state between the rotation shaft and the bearing hole according to another variation in an enlarged manner.
Figure 8:
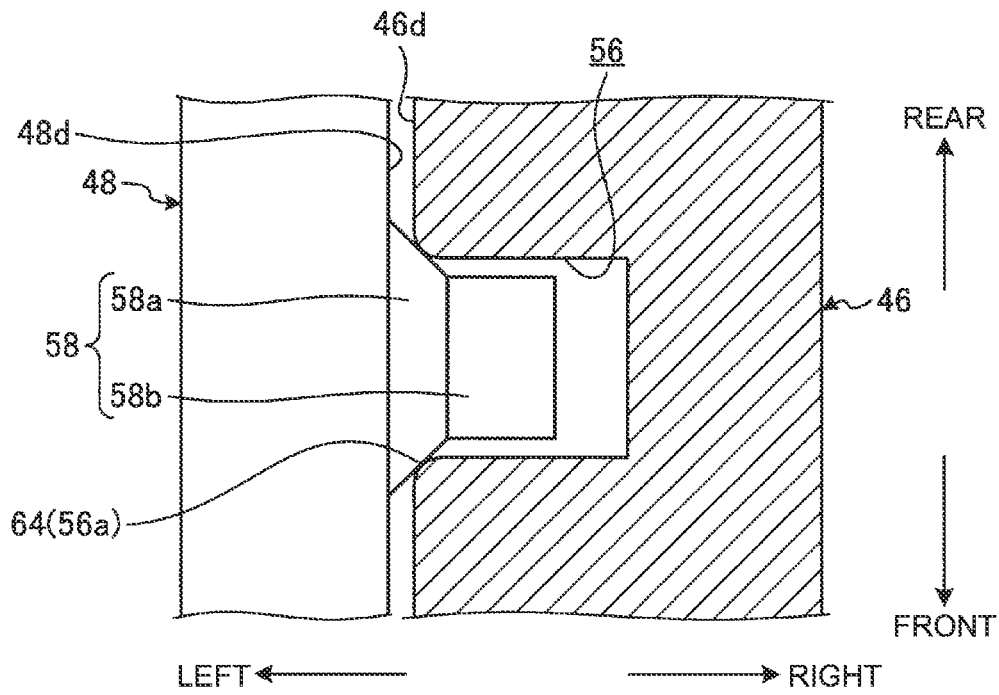
FIG. 8 is a sectional plan view of a main portion schematically illustrating a connection state between a rotation shaft and a bearing hole according to yet another variation in an enlarged manner.

In the embodiment, the opening edge 56*a* of the bearing hole 56 in contact with the tapered portion 58*a* of the rotation shaft 58 (60) has a right angle (see FIG. 5), as an example, but the opening edge 56*a* may have a chamfered shape 62 (see FIG. 7) or a rounded (R) shape 64 (see FIG. 8).

Figure 9:
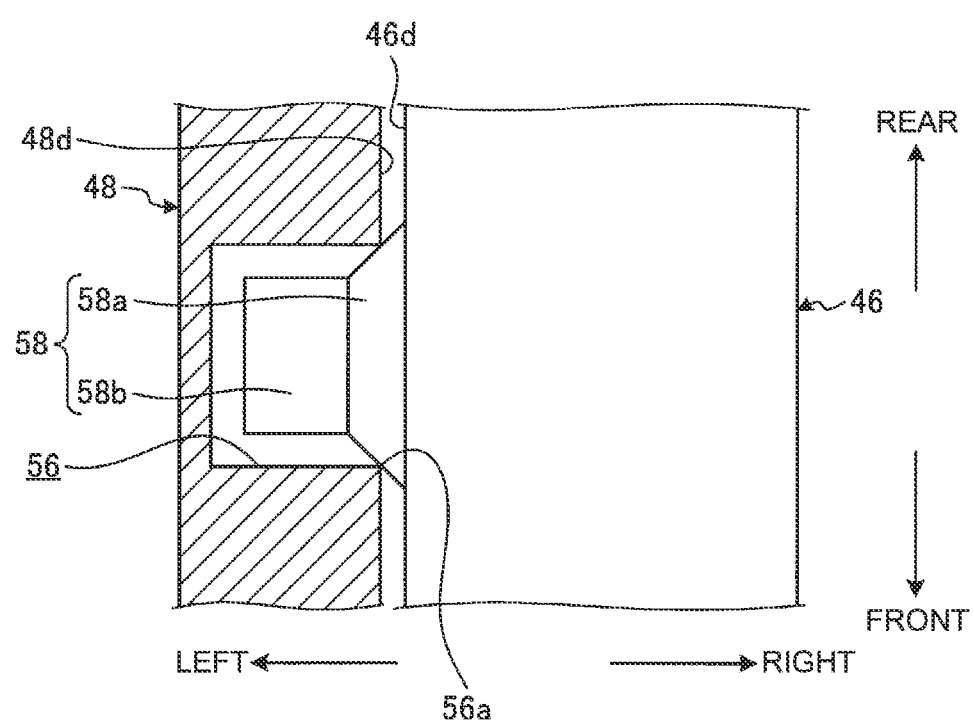
FIG. 9 is a sectional plan view of a main portion schematically illustrating a configuration of a guide mechanism in which a rotation shaft is disposed to an outer frame member and an inner member has a bearing hole, in an enlarged manner.

In the embodiment, the guide mechanism 32 is configured such that the rotation shaft 58 (60) is disposed to the inner member 48 and the outer frame member 46 has the bearing hole 56, as an example. Alternatively, as illustrated in FIG. 9, the guide mechanism 32 may be configured such that the inner member 48 has the bearing hole 56 and the rotation shaft 58 (60) is disposed to the outer frame member 46. That is, in the configuration of the guide mechanism 32 in which a first engagement part that is one of the bearing hole and the rotation shaft disposed in the outer frame member 46 and a second engagement part that is the other one of the bearing hole and the rotation shaft disposed in the inner member 48 are rotatably engaged with each other, the rotation shaft has the tapered portion 58*a*.

In the embodiment, the guide mechanism 32 in which the rotation shaft 58 (60) has the tapered portion 58*a* is applied to the key switches 14, as an example. Alternatively, the guide mechanism 32 is also applicable to push button devices except the key switches 14. For example, in the case of the electronic apparatus 12, the guide mechanism 32 may be applied to the click buttons 23 through 25 and the click pad 26.

The invention claimed is:

1. A push button device comprising:
    a base part;
    a guide mechanism disposed on an upper surface of the base part; and
    a push button that is guided by the guide mechanism to be vertically movable, wherein
    the guide mechanism includes:
        an outer frame member having a first end rotatably supported on the base part and a second end rotatably supported on the push button, and
        an inner member disposed inside the outer frame member and diagonally braced to the outer frame member, the inner member having a first end rotatably supported on the push button and a second end rotatably supported on the base part,
        the outer frame member has a pair of inner surfaces opposed to each other with an opening therebetween, each of the inner surfaces having a first engagement part that consists of one of a bearing hole and a rotation shaft,
        the inner member has a pair of outer surfaces opposed to the pair of inner surfaces of the outer frame member, each of the outer surfaces has a second engagement part that consists of an other one of the bearing hole and the rotation shaft, the second engagement part being rotatably engaged with the first engagement part,
        the rotation shaft has an outer peripheral surface including a tapered portion whose outer diameter gradually decreases in an insertion direction of the bearing hole,
        the bearing hole has only one inner diameter along an entire length, in the insertion direction, of the bearing hole, and
        the tapered portion has a proximal outer diameter larger than the inner diameter of an opening edge of the bearing hole, has a distal outer diameter smaller than the inner diameter of the opening edge of the bearing hole, and has an outer peripheral surface in contact with the opening edge of the bearing hole.

2. The push button device according to claim 1, wherein:
the rotation shaft has a base portion that includes the tapered portion and has a distal end portion that includes a cylindrical shaft portion, and
in the rotation shaft, the shaft portion is inserted in the bearing hole, and a part of the tapered portion is inserted in the bearing hole.

3. The push button device according to claim 1, wherein:
the inner member is a frame member having an opening inside the inner member.

4. A keyboard device comprising a plurality of push button devices, wherein at least one push button device includes:
a base part;
a guide mechanism disposed on an upper surface of the base part; and
a push button that is guided by the guide mechanism to be vertically movable, wherein
the guide mechanism includes:
an outer frame member having a first end rotatably supported on the base part and a second end rotatably supported on the push button, and
an inner member disposed inside the outer frame member and diagonally braced to the outer frame member, the inner member having a first end rotatably supported on the push button and a second end rotatably supported on the base part,
the outer frame member has a pair of inner surfaces opposed to each other with an opening therebetween, each of the inner surfaces having a first engagement part that consists of one of a bearing hole and a rotation shaft,
the inner member has a pair of outer surfaces opposed to the pair of inner surfaces of the outer frame member, each of the outer surfaces has a second engagement part that consists of an other one of the bearing hole and the rotation shaft, the second engagement part being rotatably engaged with the first engagement part,
the rotation shaft has an outer peripheral surface including a tapered portion whose outer diameter gradually decreases in an insertion direction of the bearing hole,
the bearing hole has only one inner diameter along an entire length, in the insertion direction, of the bearing hole, and
the tapered portion has a proximal outer diameter larger than the inner diameter of an opening edge of the bearing hole, has a distal outer diameter smaller than the inner diameter of the opening edge of the bearing hole, and has an outer peripheral surface in contact with the opening edge of the bearing hole.

5. The keyboard device according to claim 4, further comprising:
a frame partitioning adjacent push buttons.

6. An electronic apparatus comprising:
a chassis equipped with a keyboard device having:
a plurality of push button devices, wherein at least one push button device includes:
a base part;
a guide mechanism disposed on an upper surface of the base part; and
a push button that is guided by the guide mechanism to be vertically movable, wherein
the guide mechanism includes:
an outer frame member having a first end rotatably supported on the base part and a second end rotatably supported on the push button, and
an inner member disposed inside the outer frame member and diagonally braced to the outer frame member, the inner member having a first end rotatably supported on the push button and a second end rotatably supported on the base part,
the outer frame member has a pair of inner surfaces opposed to each other with an opening therebetween, each of the inner surfaces having a first engagement part that consists of one of a bearing hole and a rotation shaft,
the inner member has a pair of outer surfaces opposed to the pair of inner surfaces of the outer frame member, each of the outer surfaces has a second engagement part that consists of an other one of the bearing hole and the rotation shaft, the second engagement part being rotatably engaged with the first engagement part, and
the rotation shaft has an outer peripheral surface including a tapered portion whose outer diameter gradually decreases in an insertion direction of the bearing hole,
the bearing hole has only one inner diameter along an entire length, in the insertion direction, of the bearing hole, and
the tapered portion has a proximal outer diameter larger than the inner diameter of an opening edge of the bearing hole, has a distal outer diameter smaller than the inner diameter of the opening edge of the bearing hole, and has an outer peripheral surface in contact with the opening edge of the bearing hole; and
a display chassis including a display that displays in accordance with an input operation to at least one of the push button devices of the keyboard device, the display chassis being rotatably connected to the chassis.

* * * * *